United States Patent
Lin et al.

(10) Patent No.: US 9,312,678 B2
(45) Date of Patent: Apr. 12, 2016

(54) SURGE PROTECTION DEVICE

(75) Inventors: Yu-Jei Lin, Taipei (TW); Chia-Ming Chang, Taipei (TW); Ming-Tsai Kao, Taipei (TW)

(73) Assignee: Cyber Power Systems Inc., Taipei (TW)

( * ) Notice: Subject to any disclaimer, the term of this patent is extended or adjusted under 35 U.S.C. 154(b) by 515 days.

(21) Appl. No.: 13/614,038

(22) Filed: Sep. 13, 2012

(65) Prior Publication Data
US 2014/0071572 A1  Mar. 13, 2014

(51) Int. Cl.
 *H02H 3/22* (2006.01)
 *H02H 3/20* (2006.01)
 *H02H 3/02* (2006.01)
 *H02H 9/04* (2006.01)

(52) U.S. Cl.
 CPC ............... *H02H 3/20* (2013.01); *H02H 3/025* (2013.01); *H02H 9/04* (2013.01)

(58) Field of Classification Search
 USPC ........................................................ 361/111
 See application file for complete search history.

(56) References Cited

U.S. PATENT DOCUMENTS

| 4,068,276 | A  | * | 1/1978  | Pintell ................... H02H 3/105 361/46 |
| 5,136,230 | A  | * | 8/1992  | Gayler ................... H02J 7/0032 320/127 |
| 6,118,639 | A  | * | 9/2000  | Goldstein ....................... 361/55 |
| 6,157,529 | A  | * | 12/2000 | Ahuja ............................ 361/111 |
| 6,816,350 | B1 | * | 11/2004 | Hoopes ................... H02H 3/207 361/56 |
| 2012/0200300 | A1 | * | 8/2012 | Lamb ............................ 324/537 |

* cited by examiner

*Primary Examiner* — Stephen W Jackson
*Assistant Examiner* — Ann Hoang
(74) *Attorney, Agent, or Firm* — Rosenberg, Klein & Lee (57) ABSTRACT

A surge protection device has a pulse controlled switch, a pulse generation circuit and an abnormal voltage detection circuit. The surge control switch is connected in series to a power line loop and has at least one control terminal respectively connected to output terminals of the pulse generation circuit and the abnormal voltage detection circuit. An output terminal of the abnormal voltage detection circuit is connected to the power line loop and is located in the back end of the pulse controlled switch. The pulse generation circuit serves to send a pulse to the pulse controlled switch to close the pulse controlled switch and connect to the power line loop. When continuously detecting abnormal voltage in the power line loop, the abnormal voltage detection circuit opens the pulse controlled switch and disconnects from the power line loop so as to protect back-end equipment or circuit.

4 Claims, 7 Drawing Sheets

SURGE PROTECTION DEVICE

BACKGROUND OF THE INVENTION

1. Field of the Invention

The present invention relates to a surge protection device and more particularly to a surge protection device providing surge protection for back-end circuit and itself.

2. Description of the Related Art

To protect power supply equipment and a load receiving power from the power supply equipment against the damage caused by lightning, a surge absorber is traditionally connected to a power line loop. The surge absorber is mainly built with a metal oxide varistor (MOV) and serves to absorb enormous energy generated upon discharge of lightning. As specified in UL1449 safety standards, a surge protection device should be tested with an abnormal voltage in a range of 240 VAC, 0.2 A~1000 A. Under the condition of the abnormal voltage, the MOV is short-circuited due to thermal activation and the huge current passing through the MOV causes the MOV to generate high heat. There is a likelihood that the MOV may explode or burn to put surrounding equipment and humans in jeopardy. Another potential risk is that when failing to withstand high voltage, such as 220 volts, the back-end circuit may also explode and burn to endanger equipment and humans nearby.

Figure 7:
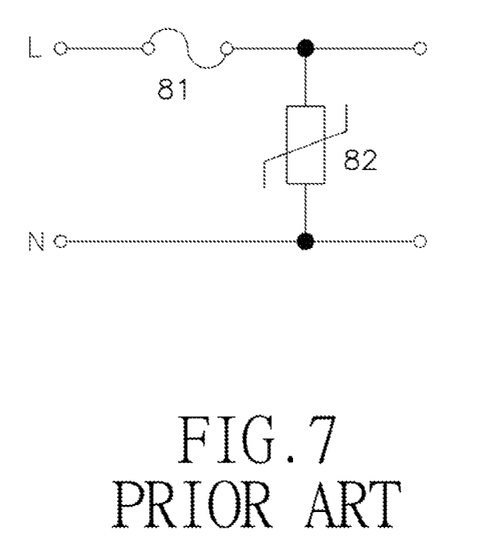
FIG. 7 is a circuit diagram of a conventional surge protection device.

Therefore, the MOV itself needs protection too. The protection means for a conventional MOV is to incorporate a thermal fuse with the MOV. With reference to FIG. 7, given a power line loop with a live line and a neutral line as an example, a thermal fuse 81 is connected in series with the live line of the power line loop, and an MOV 82 is connected between the live line and the neutral line and is connected to a back end of the thermal fuse 81. The MOV 82 generates excessive heat when getting short-circuited and the excessive heat further melts the thermal fuse to disconnect with the power line loop. However, as the MOV 82 is suddenly activated and heat generated by the MOV 82 is unable to be promptly dissipated due to thermal resistance, the MOV 82 has usually exploded and caught fire during the course of the thermal fuse 81, and the back-end circuit often encounters damage as well. As a consequence, the surge protection circuit having the MOV 82 and the thermal fuse 81 fails to be operational again after the activation of the MOV 82.

It is also known that surge protection devices can be improved by having a switching element connected to the power line loop and controlled by a voltage detection circuit. When the voltage detection circuit detects an abnormal voltage or a surge, a switch originally in a closed state in the power line loop is switched to an open state to disconnect with the power line loop, thereby avoiding lightning surge or abnormal voltage to enter the back-end circuit of the surge protection device. The disadvantage of such technique resides in that switch bounce may occur at an operating point for protection which will jeopardize the back-end circuit.

In view of the switch bounce issue at the operating point for protection, a feasible countermeasure is to add an over-voltage protection circuit with hysteresis and set up a protection voltage and a recovery voltage. When an abnormal voltage exceeds the protection voltage, the power line loop is disconnected. After the voltage drops to the recovery voltage, the power line loop is connected again. Such approach can indeed effectively protect against the condition of long-time abnormal voltage with little fluctuation. However, to tackle the issue that the voltage fluctuates excessively or transient surge occurs from time to time, such approach has its limitations.

SUMMARY OF THE INVENTION

An objective of the present invention is to provide a surge protection device effectively resolving switch bounce occurring at an operating point for protection and providing thorough protection for its own elements and back-end circuit.

To achieve the foregoing objective, the surge protection device has a pulse controlled switch, a pulse generation circuit and an abnormal voltage detection circuit.

The pulse controlled switch is adapted to connect in series to a power line loop and has at least one control terminal.

The pulse generation circuit has an input terminal and an output terminal. The input terminal is adapted to connect to the power line loop and is located in a front end of the pulse controlled switch. The output terminal is connected to the at least one control terminal of the pulse controlled switch.

The abnormal voltage detection circuit has at least one detection input terminal and an output terminal. The at least one detection input terminal is adapted to connect to the power line loop and is located in a back-end of the pulse controlled switch. The output terminal is connected to the at least one control terminal of the pulse controlled switch.

The surge protection device connects to the power line loop by using the pulse generation circuit to send a pulse to the pulse controlled switch so as to close the pulse controlled switch and connect to the power line loop. When continuously detecting abnormal voltage in the power line loop, the abnormal voltage detection circuit sends a pulse to the pulse controlled switch to open the pulse controlled switch and disconnect to the power line loop so as to protect back-end equipment or circuit.

The advantages of the surge protection device can be summarized as follow.

1. A surge protection device with effective protection against switch bounce: The present invention employs a pulse controlled switch to connect or disconnect to a power line loop. The pulse controlled switch is controlled to open or close by a pulse. When the pulse is sent to the control terminal of the pulse controlled switch, the pulse controlled switch is closed and is kept at the closed state. A subsequent pulse sent to the control terminal can open the pulse controlled switch and the pulse controlled switch is kept at the open state. Hence, when starting operation of the surge protection device, the surge generation circuit generates a pulse that is sent to the control terminal of the pulse controlled switch to close the pulse controlled switch and connect the surge protection device to the power line loop. When continuously detecting abnormal voltage or surge on the power line loop, the abnormal voltage detection circuit generates a pulse that is sent to the control terminal of the pulse controlled switch to open the pulse controlled switch and disconnect the surge protection device from the power line loop so as to protect the back-end circuit. As the pulse controlled switch can be opened and closed and maintained at the controlled state, the switch bounce issue occurring at an operation point for protection is effectively avoided to secure the protection for the back-end circuit.

2. A restorable surge protection device: After the voltage of the power line loop recovers, the pulse generation circuit sends a pulse to the control terminal of the pulse controlled switch so that the pulse controlled switch can be closed again and the back-end equipment or circuit can be normally operated.

3. An energy-saving and environment-protective surge protection device: As a state of the pulse controlled switch can be changed and maintained with a pulse, there is no power consumed in maintaining the controlled state of the pulse controlled switch and the surge protection device is therefore energy-saving.

Other objectives, advantages and novel features of the invention will become more apparent from the following detailed description when taken in conjunction with the accompanying drawings.

DETAILED DESCRIPTION OF THE INVENTION

Figure 1:
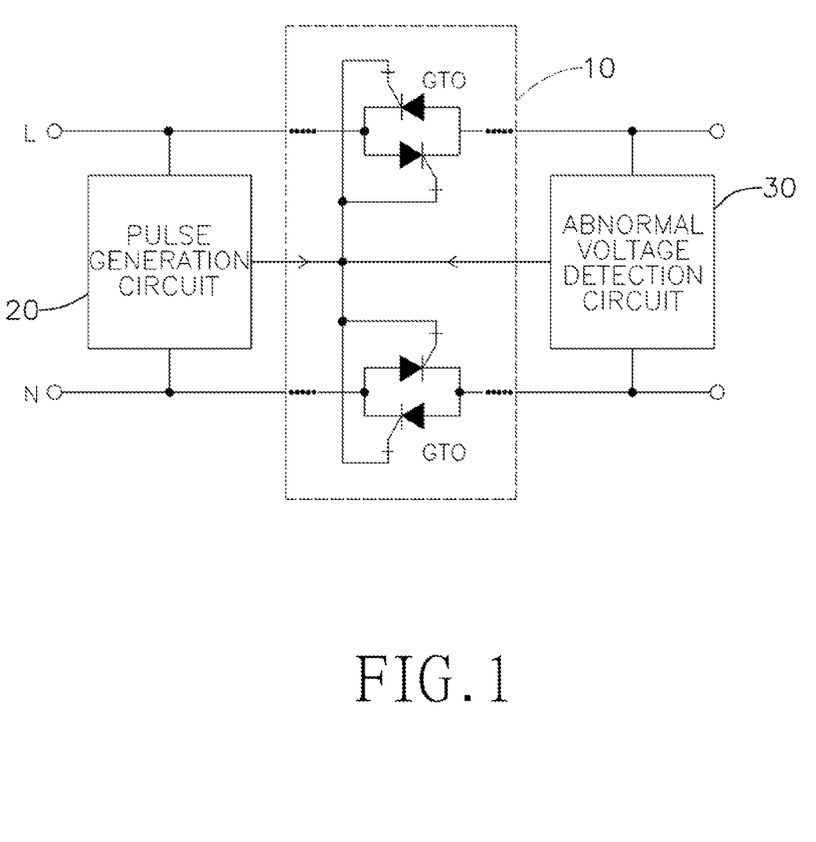
FIG. 1 is a functional circuit diagram of a first embodiment of a surge protection device in accordance with the present invention.

With reference to FIG. 1, a first embodiment of a surge protection device in accordance with the present invention has a pulse controlled switch 10, a pulse generation circuit 20 and an abnormal voltage detection circuit 30 connected to a power line loop.

The pulse controlled switch 10 is connected in series to the power line loop and has at least one control terminal respectively connected to an output terminal of the pulse generation circuit 20 and an input terminal of the abnormal voltage detection circuit 30. In the present embodiment, the power line loop has a live line and a neutral line. The pulse controlled switch 10 may have two gate turn-off thyristors (GTO) respectively connected in series with the live line and the neutral line of the power line loop. Each GTO has a gate as its control terminal connected to one of the output terminal of pulse generation circuit 20 and the output terminal of abnormal voltage detection circuit 30.

The pulse generation circuit 20 has an input terminal and an output terminal. The input terminal is connected to the power line loop and is located in the front end of the pulse controlled switch 10. The output terminal is connected to the at least one control terminal of the pulse controlled switch 10.

The abnormal voltage detection circuit 30 has at least one detection input terminal and an output terminal. The at least one detection input terminal is connected to the power line loop and is located in the back-end of the pulse controlled switch 10. The output terminal is connected to the at least one control terminal of the pulse controlled switch.

Figure 2:
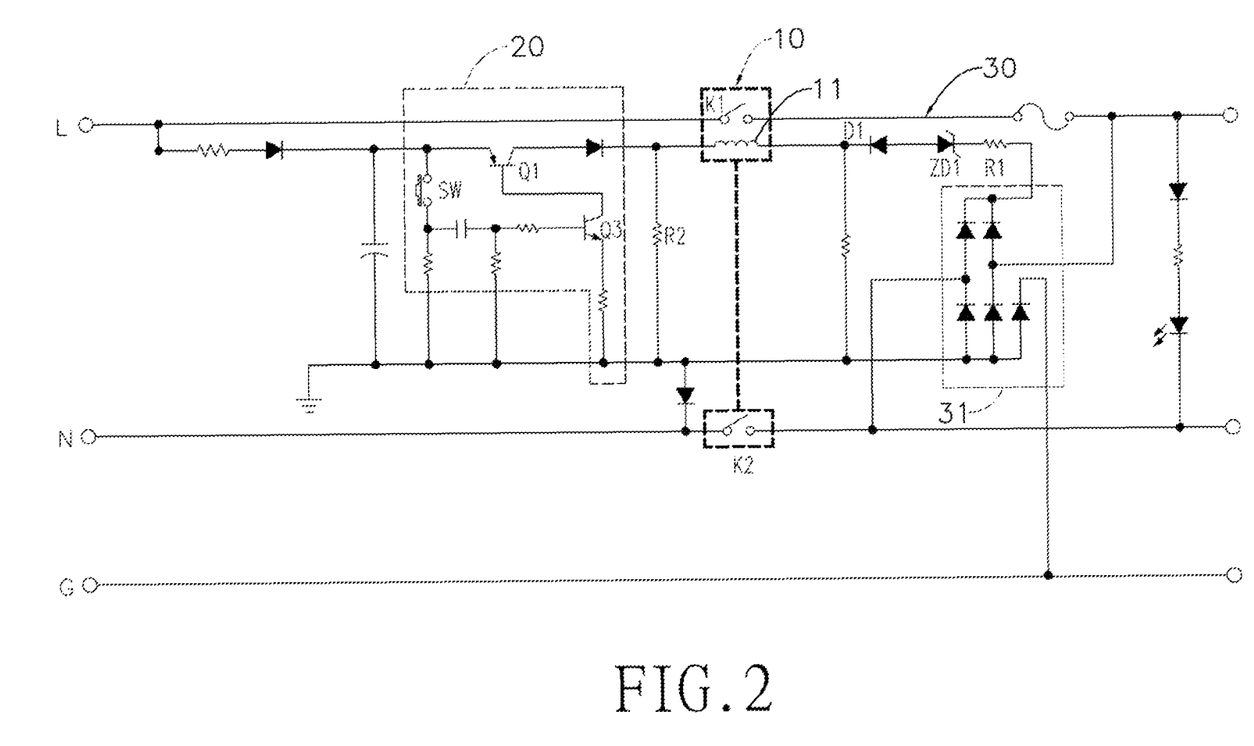
FIG. 2 is a circuit diagram of the surge protection device in FIG. 1.

Besides the GTO, the pulse controlled switch 10 may have a pulse relay. With reference to FIG. 2, the pulse controlled switch 10 has a pulse relay, and the pulse controlled switch 10 has an excitation coil 11 and two switch contacts K1, K2. The excitation coil 11 has a forward control terminal and a reverse control terminal. The forward control terminal is connected to the pulse generation circuit 20. The reverse control terminal is connected to the abnormal voltage detection circuit 30. The two switch contacts K1, K2 are controlled by the excitation coil 11 and are respectively connected in series with the live line and the neutral line to connect and disconnect with the live line and the neutral line. In the following, the portion of the power line loop in the front end of the switch contacts K1, K2 is termed as an input side and the portion of the power line loop in the back end of the switch contacts K1, K2 is termed as an output side.

The input terminal of the pulse generation circuit 20 is connected to the power line loop, and the output terminal thereof is connected to the forward control terminal of the excitation coil 11.

The at least one detection input terminal of the abnormal voltage detection circuit 30 is connected to the live line and the neutral line of the power line loop, and the output terminal thereof is connected to the reverse control terminal of the excitation coil 11.

Given the foregoing circuit structure, if the excitation coil 11 of the pulse controlled switch 10 outputs a pulse through the forward control terminal to close the switch contacts K1, K2, the input side and the output side of the power line loop are connected. If the excitation coil 11 outputs a pulse through the reverse control terminal, the switch contacts K1, K2 of the excitation coil 11 are open and the input side and the output side of the power line loop are disconnected. The pulse outputted from the forward control terminal of the excitation coil 11 is generated by the pulse generation circuit 20. The pulse outputted from the reverse control terminal of the excitation coil 11 is generated by the abnormal voltage detection circuit 30 when the abnormal voltage detection circuit 30 constantly detects abnormal voltage.

The pulse generation circuit 20 has a first transistor Q1, a second transistor Q3 and a control button SW. In the present embodiment, the first transistor Q1 is a PNP transistor, the emitter of the first transistor Q1 is connected to the live line of the power line loop through a diode and a resistor, the collector thereof is connected to the forward control terminal of the excitation coil 11 through another diode, and the base of the first transistor Q1 is connected to the collector of the second transistor Q3. The base of the second transistor Q3 is connected to the live line of the power line loop through the control button SW. When the control button SW is pressed, a small pulse is transmitted to the base of the second transistor Q3. When the second transistor Q3 is turned on, the voltage across the emitter and the collector of the second transistor Q3 is zero volts, and the first transistor Q1 is thus turned on. The current passing through the first transistor Q1 sends a pulse to the forward control terminal of the excitation coil 11. The switch contacts K1, K2 of the pulse controlled switch 10 are closed and the live line and the neutral line of the power line loop are connected. Then, the voltage of the power line loop is monitored by the abnormal voltage detection circuit 30.

In the present embodiment, the abnormal voltage detection circuit 30 has a detection input unit 31, a resistor R1, a zener diode ZD1 and a diode D1.

The detection input unit 31 has multiple diodes connected in series with one another and has multiple detection input terminals and an output terminal. In the present embodiment, a three-phase (L, N, G) power line loop is given, the detection input terminals of the detection input unit 31 are respectively connected to the live line, the neutral line and the ground line of the power line loop. The abnormal voltage or surge occurring on any of the live line, the neutral line and the ground line of the power line loop surely enters the abnormal voltage detection circuit 30 through the detection input unit 31 and passes through the resistor R1 and the zener diode ZD1 to generate a pulse. When the pulse passes through the excitation coil 11, the switch contacts K1, K2 are open.

Figure 3:
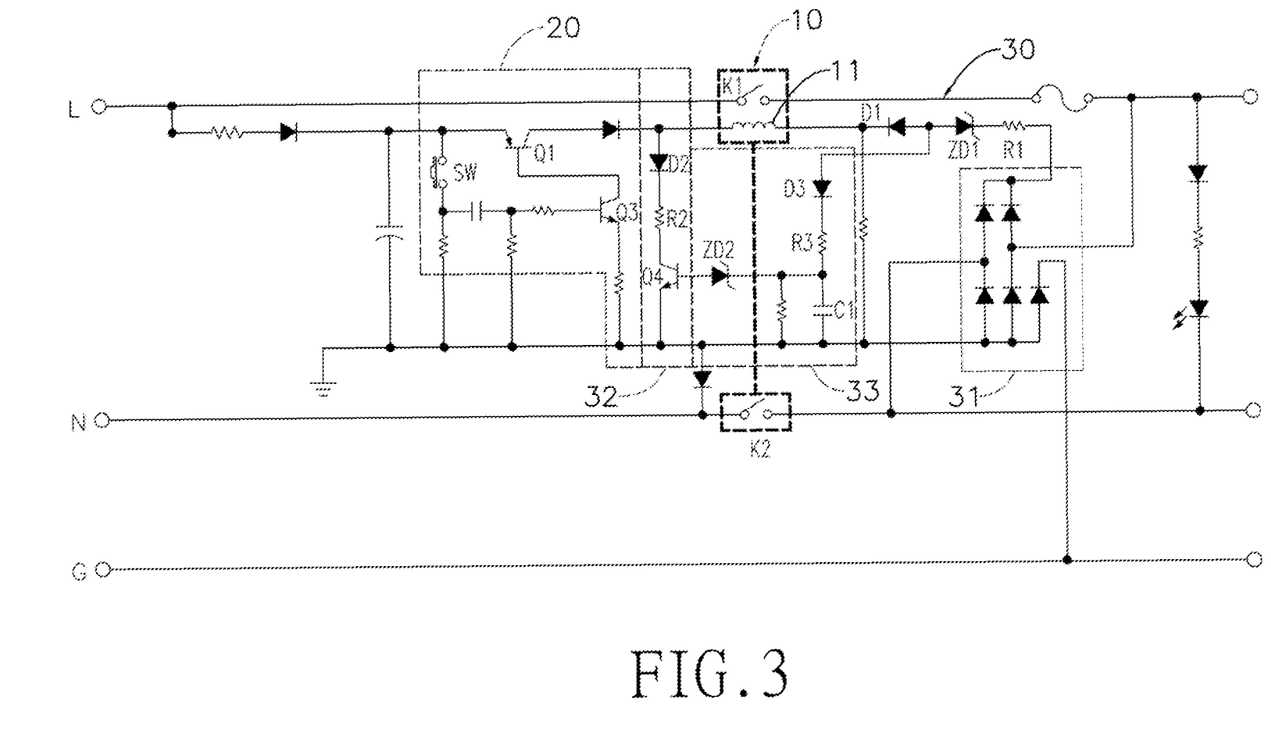
FIG. 3 is a circuit diagram of a second embodiment of a surge protection device in accordance with the present invention.

With reference to FIG. 3, a second embodiment of a surge protection device in accordance with the present invention is similar to the first embodiment except that the abnormal voltage detection circuit 30 further has a reverse loop control unit 32 and a surge-filtering unit 33. The reverse loop control unit 32 has a diode D2, a resistor 2 and a transistor Q4 connected in series between the forward control terminal of the excitation coil 11 and the live line of the power line loop. The base of the transistor Q4 is connected to the output terminal of the detection input unit 31, and the emitter thereof is grounded. When the surge or abnormal voltage on the power line loop lasts enough time (approximately 0.8~1 ms), the transistor Q4 is then turned on. The reverse loop of the excitation coil 11 is formed and the switch contacts K1, K2 are open when a pulse passes through the excitation coil 11.

An input terminal of the surge-filtering unit 33 is connected to the output terminal of the detection input unit 31. The surge-filtering unit 33 has a diode D3, a resistor R3, a capacitor C1 and a zener diode ZD2 connected in series with one another. A node connected in series between the resistor R3 and the capacitor C1 is connected to the base of the transistor Q4 of the reverse loop control unit 32 through the zener diode ZD2.

The surge-filtering unit 33 can distinguish if an abnormal signal entering the detection input unit 31 is a surge or an abnormal AC voltage higher than 140 volts. As a surge is usually an abnormal signal with extremely high voltage (6,000 volts) but rather short time duration, the surge charges the capacitor C1 through the diode D3 and the resistor R3 after the surge enters the surge-filtering unit 33. If the abnormal signal lasts very briefly, the voltage of the capacitor C1 is less than a sum of $V_{ZD2}$ and $V_{BE4}$, where $V_{ZD2}$ denotes the voltage across the zener diode ZD2 and $V_{BE4}$ denotes the voltage across the base and emitter of the transistor Q4. The transistor Q4 of the reverse loop control unit 32 is turned off, and no pulse passes through the excitation coil 11. If the abnormal signal lasts continuously, the voltage of the capacitor C1 is greater than the sum of $V_{ZD2}$ and $V_{BE4}$. The transistor Q4 of the reverse loop control unit 32 is turned on, a pulse passes through the excitation coil 11 and the switch contacts K1, K2 are open to protect a surge absorption circuit and a back-end circuit.

Figure 4:
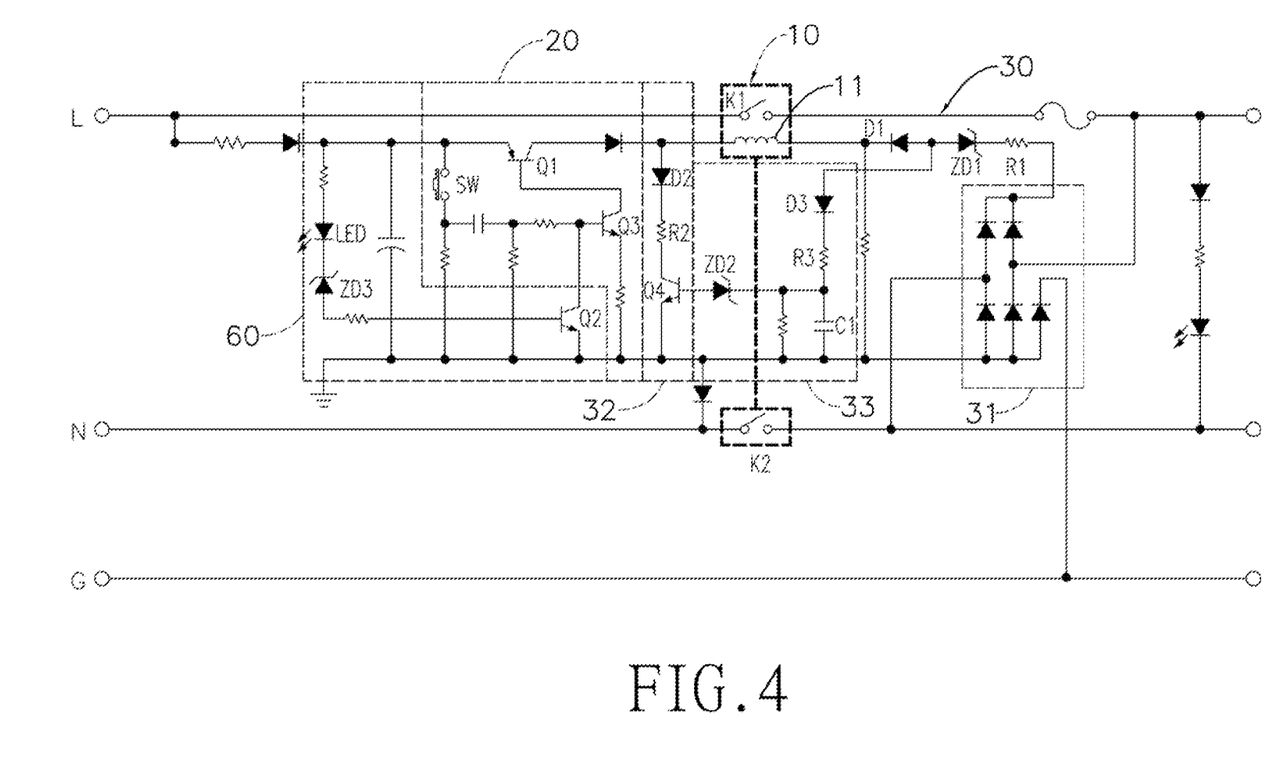
FIG. 4 is a circuit diagram of a third embodiment of a surge protection device in accordance with the present invention.

With reference to FIG. 4, a third embodiment of a surge protection device in accordance with the present invention is similar to the first and second embodiments except that the pulse generation circuit 20 is further connected to a abnormal voltage alert circuit 60. The abnormal voltage alert circuit 60 has a transistor Q2, a zener diode ZD3 and a light-emitting diode LED. The collector of the transistor Q2 is connected to the base of the second transistor Q2 of the pulse generation circuit 20. The base of the transistor Q2 of the abnormal voltage alert circuit 60 is connected to the live line of the power line loop through the zener diode ZD3 and the light-emitting diode LED. In the present embodiment, an AC voltage higher than 140 volts is set to be an abnormal voltage. The light-emitting diode LED emits a red light to warn users that the mains power is currently in an abnormal state, and adjusts its luminance according to the magnitude of the abnormal voltage. Furthermore, when an abnormal voltage takes place, the transistor Q2 of the abnormal voltage alert circuit 60 pulls the base voltage of the second transistor Q3 of the pulse generation circuit 20 down to almost zero volts, such that the control button SW is unable to be operated. Thus, when an abnormal voltage occurs, the switch contacts K1 K2 are open. Even when the abnormal voltage, persists, the control button SW still fails to start the surge protection device so as to ensure the safety of the back-end circuit.

Figure 5:
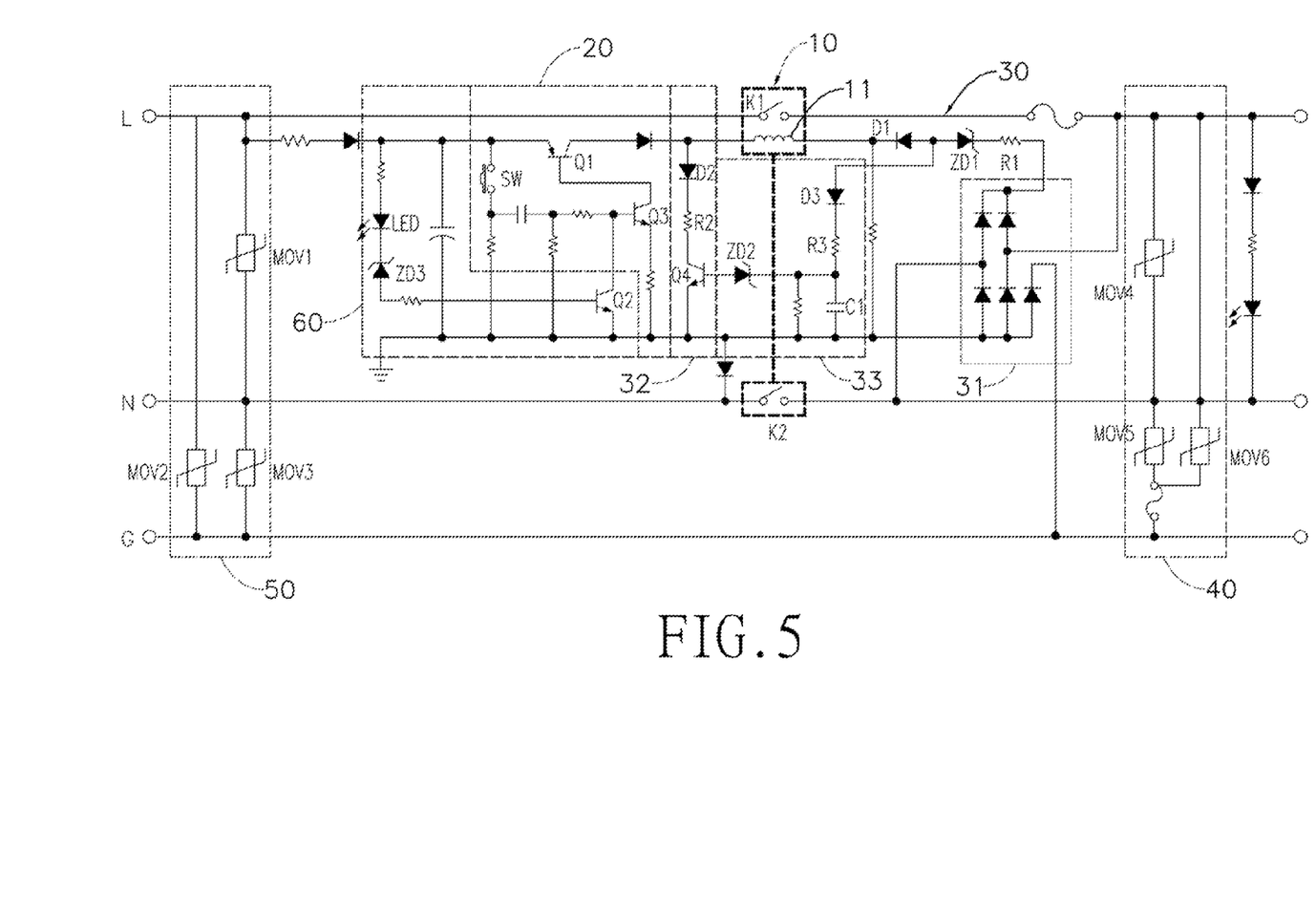
FIG. 5 is a circuit diagram of a fourth embodiment of a surge protection device in accordance with the present invention.

With reference to FIG. 5, a fourth embodiment of a surge protection device in accordance with the present invention is similar to the foregoing three embodiments except that the surge protection device further has two surge absorption circuits 40, 50 respectively connected to the output side and the input side of the power line loop. Each surge absorption circuit 40, 50 has multiple MOVs (MOV4~MOV6) (MOV1~MOV3) respectively connected between the live line and the neutral line, the live line and the ground line, and the neutral line and the ground line.

Figure 6:
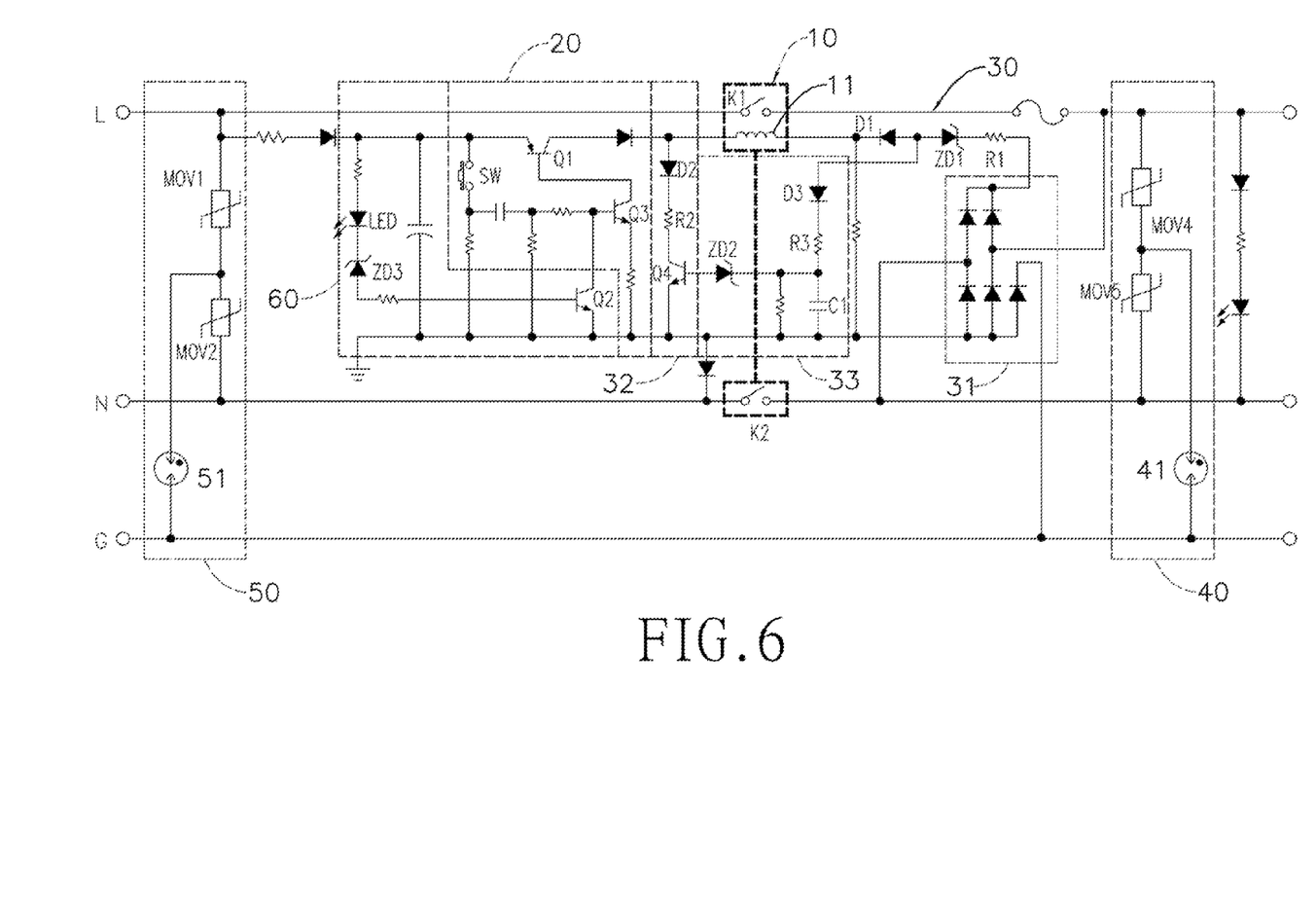
FIG. 6 is a circuit diagram of a fifth embodiment of a surge protection device in accordance with the present invention.

With reference to FIG. 6, a fifth embodiment of a surge protection device in accordance with the present invention is similar to the foregoing three embodiments except that the surge protection device further has two surge absorption circuits 40', 50' respectively connected to the output side and the input side of the power line loop. Each surge absorption circuit 40', 50' has two MOVs (MOV4, MOV5) (MOV1, MOV2) and a spark gap 41, 51. The MOVs are connected between the live line and the neutral line of the power line loop. A node connected in series between the two MOVs (MOV4, MOV5) (MOV1, MOV2) is connected to the ground line of the power line loop through the spark gap 41, 51.

The additional surge absorption circuits in the fourth and fifth embodiments further enhance the protective effect against lightning and surge.

Even though numerous characteristics and advantages of the present invention have been set forth in the foregoing description, together with details of the structure and function of the invention, the disclosure is illustrative only. Changes may be made in detail, especially in mailers of shape, size, and arrangement of parts within the principles of the invention to the full extent indicated by the broad general meaning of the terms in which the appended claims are expressed.

What is claimed is:
1. A surge protection device comprising:
 a pulse controlled switch being a pulse relay, adapted to connect in series to a power line loop and having:
  an excitation coil having a forward control terminal and a reverse control terminal; and
  two switch contacts controlled by the excitation coil and adapted to connect in series to or disconnect from the power line loop;
 a pulse generation circuit having:
  an input terminal adapted to connect to the power line loop and located in a front end of the pulse controlled switch;
  an output terminal connected to the forward control terminal of the excitation coil of the pulse controlled switch;
  a control button;
  a first transistor being a PNP transistor, wherein an emitter of the first transistor is adapted to connect to the power line loop, and a collector of the first transistor is connected to the forward control terminal of the excitation coil; and
  a second transistor being an NPN transistor, wherein a collector of the second transistor is connected to a base of the first transistor, and a base of the second transistor is adapted to connect to the power line loop through the control button; and
 an abnormal voltage detection circuit having:

at least one detection input terminal adapted to connect to the power line loop and located in a back-end of the pulse controlled switch;

an output terminal connected to the reverse control terminal of the excitation coil of the pulse controlled switch;

a detection input unit having multiple first diodes connected in series with one another and having:
multiple detection input terminals adapted to connect to the power line loop; and
an output terminal;

a reverse loop control unit having a second diode, a first resistor and a third transistor connected in series between the forward control terminal of the excitation coil and the power line loop, wherein a base of the third transistor is connected to the output terminal of the detection input unit, and an emitter of the third transistor is grounded; and a surge-filtering unit having a third diode, a second resistor, a capacitor and a first zener diode, wherein an input terminal of the surge-filtering unit is connected to the output terminal of the detection input unit, and a node connected in series between the second resistor and the capacitor is connected to the base of the third transistor of the reverse loop control unit through the first zener diode;

wherein when the control button is pressed, a pulse is transmitted to the base of the second transistor, when the second transistor is turned on, the first transistor is turned on and a current passing through the first transistor sends another pulse to the forward control terminal of the excitation coil to close the two switch contacts of the pulse controlled switch and connect the switch contacts to the power line loop; and when the abnormal voltage detection circuit detects an abnormal voltage occurring on the power line loop, a pulse generated by the abnormal voltage detection circuit is sent to the reverse control terminal of the excitation coil to control the two switch contacts of the pulse controlled switch to be open and disconnected from the power line loop.

2. The surge protection device as claimed in claim 1 wherein the pulse generation circuit is further connected to an abnormal voltage alert circuit; and the abnormal voltage alert circuit has:
a second zener diode;
a light-emitting diode; and
a fourth transistor, wherein a collector of the fourth transistor is connected to the base of the second transistor of the pulse generation circuit, and a base of the fourth transistor of the abnormal voltage alert circuit is adapted to connect to the power line loop through the second zener diode and the light-emitting diode.

3. The surge protection device as claimed in claim 2, further comprising two surge absorption circuits respectively adapted to connect to an output side and an input side of the power line loop, wherein each surge absorption circuit has multiple metal oxide varistors (MOVs) adapted to respectively connect between each two of a live line, a neutral line and a ground line of the power line loop.

4. The surge protection device as claimed in claim 2, further comprising two surge absorption circuits respectively adapted to connect to an output side and an input side of the power line loop, wherein each surge absorption circuit has two MOVs and a spark gap, the MOVs are adapted to connect between a live line and a neutral line of the power line loop, and a node connected in series between the two MOVs is adapted to connect to a ground line of the power line loop through the spark gap.

* * * * *